United States Patent [19]
Lai et al.

[11] Patent Number: 5,344,895
[45] Date of Patent: Sep. 6, 1994

[54] POLYAMIDEIMIDE COMPOSITION WITH IMPROVED PROCESSABILITY

[75] Inventors: Xiaoyun Lai; Dafang Zhao, both of Brown Deer, Wis.; Francis Lai, Middleton, Mass.

[73] Assignee: University of Massachusetts Lowell, Lowell, Mass.

[21] Appl. No.: 42,235

[22] Filed: Apr. 1, 1993

[51] Int. Cl.$^5$ .................. C08L 67/04; C08L 79/08
[52] U.S. Cl. ............................ 525/425; 525/432; 525/436
[58] Field of Search .................... 525/425, 432, 436

[56] References Cited

U.S. PATENT DOCUMENTS

| | | | |
|---|---|---|---|
| 3,459,706 | 8/1969 | Schweitzer | 260/47 |
| 4,992,514 | 2/1991 | Schultze et al. | 525/425 |
| 5,162,454 | 11/1992 | Pfaendner | 525/432 |

FOREIGN PATENT DOCUMENTS 62-270625 11/1987 Japan .

OTHER PUBLICATIONS

Skross et al., "Processing Tips for Molding Poly(Amide–Imide) Resins", *Plastics Engineering*, Jan. 1976, pp. 35–36.

*Primary Examiner*—Ana L. Carrillo
*Attorney, Agent, or Firm*—Hamilton, Brook, Smith & Reynolds

[57] ABSTRACT

A polymer composition is disclosed which includes a polyamideimide polymer and a liquid crystalline polymer, wherein the amount of the liquid crystalline polymer is in an amount which significantly decreases the melt viscosity of the polyamideimide polymer while not significantly decreasing the mechanical properties of the polyamideimide polymer.

9 Claims, 9 Drawing Sheets

POLYAMIDEIMIDE COMPOSITION WITH IMPROVED PROCESSABILITY

BACKGROUND OF THE INVENTION

Polyamideimides (PAI) are amorphous high temperature engineering thermoplastics, which have excellent mechanical, electrical and thermal properties. These engineering resins can be used at temperatures well beyond the limits of most other high performance plastics and are stiffer and stronger at high temperatures of up to about 260° C. than many high performance materials are at room temperature. Polyamideimides are reliable for long-term use at high temperatures, maintaining their dimensions under loads and at high temperatures. The low coefficients of linear thermal expansion allow the integration of polyamideimide components with metals. Polyamideimides can absorb impact energy better than most other high modulus materials. Polyamideimides are ideal for moving parts because they have low wear, excellent creep resistances and self-lubricity.

However, polyamideimides are often not used because their high melt viscosity causes significant pressure loss in conventional injection molding equipment. Polyamideimide can only be processed with equipment that has been modified to reduce the pressure loss. The expense and inconvenience of modifying equipment has made polyamideimide a less desirable material for product manufacturers.

Common processing aids, such as metal stearate, stearic acid, low molecular weight polyethylene and wax, are thermally degraded at the processing temperature of polyamideimide, which is typically at a temperature of about 350° C. Often, polytetrafluoroethylene (PTFE) is used as a processing aid to improve the flow behavior of polyamideimide during injection molding. However, PTFE itself has a high viscosity, and it can cause plating lamination and some agglomeration even when a small amount, less than three percent by weight, of polytetrafluoroethylene is used. If more than 3% polytetrafluoroethylene is used, some of the mechanical properties of polyamideimides start to deteriorate. Using polytetrafluoroethylene as a processing aid has not been found to overcome the problems caused by the high viscosity of polyamideimide.

Therefore, a need exists for a polyamideimide thermoplastic composition that is easy to process, thermally and dimensionally stable at a high temperature, very solvent resistant, light weight with high mechanical properties and results in a lower final product cost with enhanced properties.

SUMMARY OF THE INVENTION

A polymer composition is disclosed which includes a polyamideimide polymer and a liquid crystalline polymer, wherein the amount of the liquid crystalline polymer is in an amount which significantly decreases the melt viscosity of the polyamideimide while not significantly decreasing the mechanical properties of the polyamideimide.

This invention has many advantages. For example, the polymer composition is thermally and dimensionally stable at high temperatures while allowing processing with relative ease. The polymer composition is also highly solvent resistant and fire resistant. In addition, the composition has a low gas and liquid permeability and is light weight with strong mechanical properties.

DETAILED DESCRIPTION OF THE INVENTION

The features and other details of the composition of the invention will now be more particularly described with reference to the accompanying drawings and pointed out in the claims. It will be understood that the particular embodiments of the invention are shown by way of illustration and not as limitations of the invention. The principle features of this invention can be employed in various embodiments without departing from the scope of the invention. Unless otherwise stated, all percentages are by weight.

Polyamideimide is a thermoplastic copolymer comprised of monomer units having an amide linkage group (—CONH—) and monomer units having an imide linkage group (—CONHCO—). Polyamideimides are typically formed by a two-step condensation reaction of trimellitic anhydride with any of a variety of aromatic diamines. The first step of the reaction produces a polyamide acid. The second step releases water from the polyamide acid as the imide group is formed upon heating.

Various types of polyamideimide are also commercially available from a number of sources. For example, a polyamideimide is available under the trademark Torlon ™ 4203L from Amoco Performance Products, Inc. Torlon ™ 4203L polyamideimide is formed by a polycondensation reaction of trimellitic anhydride (1,2,3-benzenetricarboxylic acid 1,2-anhydride), 4,4'-diaminodiphenyl ether and 2,5-diaminobenzene. The molecular weight of Torlon ™ 4203L is about 20,000. An example of the Torlon ™ 4203L chemical structure is as follows:

The polyamideimide is blended with a liquid crystalline polymer, which acts as a processing aid, wherein the amount of the liquid crystalline polymer is in an amount which significantly decreases the melt viscosity of the polyamideimide while not significantly decreasing the mechanical properties of the polyamideimide.

The liquid crystalline polymer suitable for acting as a processing aid include many types of polyesters. These include an aromatic polyester, an aromatic copolyester and an aromatic copolyesteramide. In a preferred embodiment, the liquid crystalline polymer is an aromatic copolyester which has a mesophase at about the temperature that the polyamideimide composition is blended. Either commercially available polyesters or synthesized polyesters can be uses with this invention. For example, a crystalline aromatic polyester commercially available from E.I. du Pont de Nemours & Co. under the trademark HX4000 ™ is suitable for significantly decreasing the melt viscosity of the polyamideimide while not significantly decreasing the mechanical properties of the polyamideimide. HX4000 ™ has a crystal mesophase transition temperature of about 320° C. and a glass transition temperature of about 180° C. HX4000 ™ is formed by polymerizing 7.5 mole percent hydroquinone, 50 mole percent terephthalic acid and 42.5 mole percent 2-phenyl-hydroquinone.

Another commercially available polyester is an aromatic copolyester under the trademark Vectra A950 ™ from Hoechst Celanese Chemical Company. The aromatic copolyester is formed by polymerizing seventy mole percent hydroxybenzonic acid and thirty mole percent 2,6-hydroxynaphthoic acid. An aromatic copolyesteramide is commercially available from Hoechst Celanese Chemical Company under the trademark Vectra B950 ™. This aromatic copolyesteramide is formed by polymerizing fifty-eight mole percent hydroxbenzoic acid with twenty-one mole percent terephthalic acid and twenty-one mole percent 4'-hydroxyacetanilide.

The polyamideimide and liquid crystalline polymer are blended by means commonly available and used in industry, such as blenders, mixers, kneaders, etc. The starting materials of the polyamideimide and liquid crystalline polymer for blending can be in many forms, such as powders, beads, fibers, etc. Prior to blending, the polymers should be dried because these polymers contain amide groups which can absorb water and can possibly effect the physical properties of the polymers. In one embodiment, the polymers are dried in a vacuum oven for about ten hours at 120° C.

The polyamideimide and liquid crystalline polymer are mixed in amounts whereby sufficient liquid crystalline polymer is included to decrease the melt viscosity while not significantly decreasing the mechanical properties of the polyamideimide. In one embodiment, the amount of liquid crystalline polymer is from about three to thirty percent. In a particularly preferred embodiment, the liquid crystalline polymer is from about five to fifteen percent. The polymers are blended at a temperature which allows both polymers to melt and mix. For instance, a temperature of about 330° C. was often found not to be adequate. However, at a temperature of about 340° C., the polymers blend well after melting.

Additional processing aids can be added in small amounts to the polyamideimide and liquid crystalline polymer blend to aid in processability, such as for better mold release. In a preferred embodiment, polytetrafluoroethylene having a 1:200 weight ratio to polyamideimide is suitable as a processing aid.

More than one polyamideimide can be blended into the composition. In addition, more than one liquid crystalline polymer can be blended into the polyamideimide composition, whereby a significant decrease in the melt viscosity of the polyamideimide while not significantly decreasing the mechanical properties of the polyamideimide.

Many commercially available polyamideimide polymer resins are only available at relatively low molecular weights which allow for possible melt processing. A post-heat treatment step often is added after molding to increase the molecular weight of the polyamideimide to improve the mechanical properties thereof.

Figure 4:
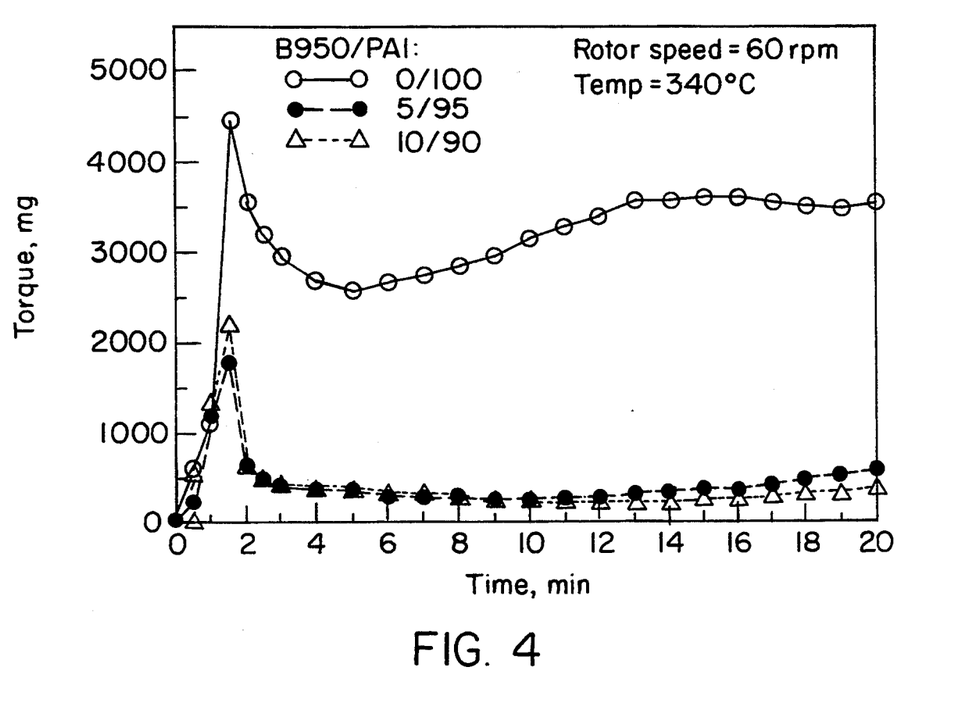
FIG. 4 is a plot of torque versus time of polyamideimide and aromatic copolyesteramide blends having weight ratios of 0/100, 5/95 and 10/90.

A significant decrease of the melt viscosity is understood to be a blend of polyamideimide and liquid crystalline polymer as compared to the melt viscosity of a polyamideimide with a liquid crystalline polymer. An example of this is seen in FIG. 4, which displays a plot of torque versus time of polyamideimide and aromatic copolyesteramide blends having weight ratios of 100/0, 95/5 and 90/10. The difference in torque between the 100 percent polyamideimide composition and the 95/5 polyamideimide composition at four minutes and aromatic copolyesteramide blend at the temperature of 340° C. is considered significantly decreased. The 100% polyamideimide has a torque of about 2,800 mg and the 95/5 blend has a torque of about 400 mg which is about an eighty-six percent decrease.

The mechanical properties of the polyamideimide liquid crystalline polymer blends can remain essentially the same as the ratio of the percentage polyamideimide to liquid crystalline polymer is changed. These properties can include but are not limited to compressibility, impact resistance, modules of elasticity, tensile strength, ultimate elongation and creep rate.

EXAMPLE 1

A series of tests was performed on a polyamideimide composition (Torlon ™ 4203L) with a crystalline aromatic copolyesteramide (Vectra ™ B950). The polyamideimide and the copolyesteramide were dried separately in a vacuum oven at 120° C. for 10 hours. The dried polymers were mixed and compounded by a Haake torque rheometer (Haake Buchler Product, Model Rheocord System 40) at a temperature of 340° C. and at a rotor speed of 60 rpm. The B950/polyamideimide blends were prepared in the following weight ratios: 100/0, 75/25, 50/50, 25/75, 10/90, 5/95 and 0/100.

The phase transition temperatures of the compositions were measured with a differential scanning calorimeter (Perkin-Elmer DSC-2C) coupled to a thermal analysis data station (TADS-3600). Temperature scans were carried out in a temperature range of from about 30° to 360° C. at a scanning rate of 20° C. per minute. Rheological properties were measured with a Gottfert capillary rheometer (model RHEOGRAPH 2001) having a die with a diameter of 1 mm and a length of 20 mm at the temperatures of 310°, 330° and 350° C. with shear rates of 20 to 2000 sec$^{-1}$.

Figure 1A:
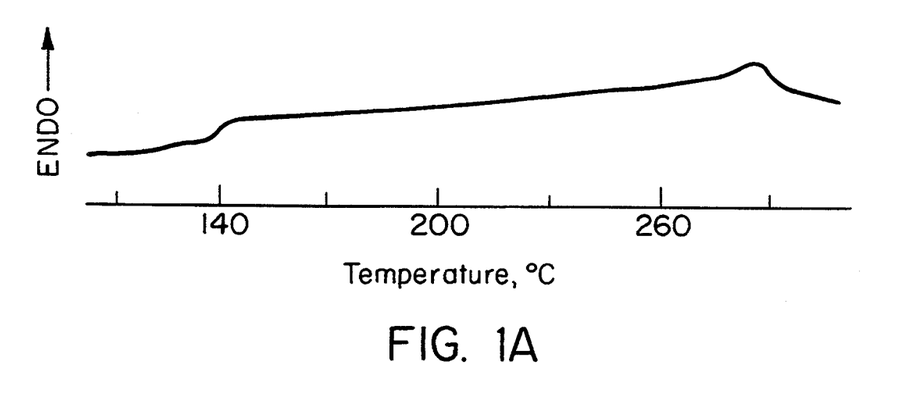
FIG. 1A is a differential scanning calorimeter thermogram of aromatic copolyesteramide (Vectra B950) in the temperature range of between about 100° and 350° C.
Figure 1B:
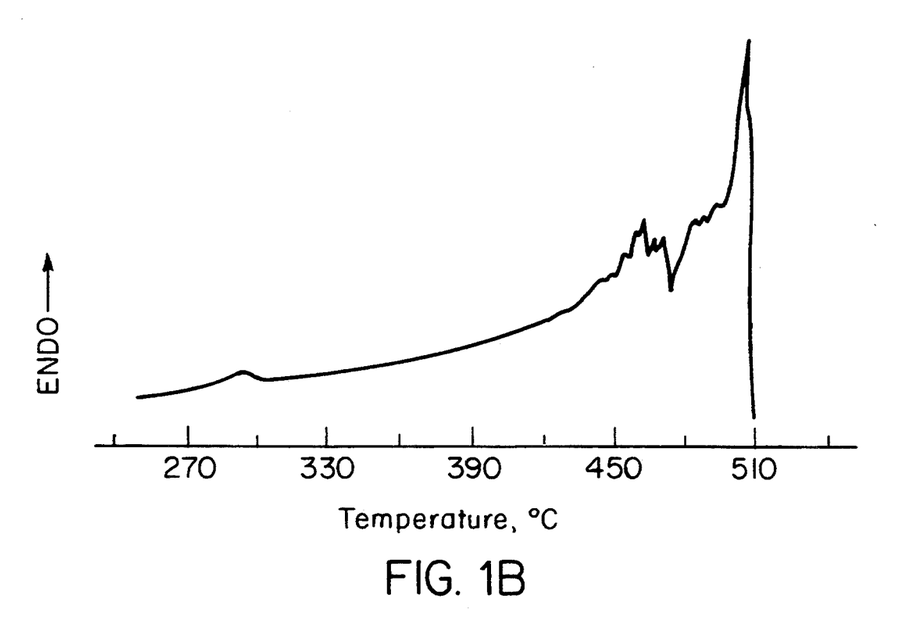
FIG. 1B is a differential scanning calorimeter thermogram for aromatic copolyesteramide (Vectra B950) in the temperature range of between about 270° and 510° C.

The differential scanning calorimeter thermograms of copolyesteramide are shown in FIGS. 1A and 1B. The glass transition temperature of copolyesteramide appeared at about 140° C. A weak endothermic peak at about 280° C. was believed to be the crystalline to nematic transition range (K→N). The nematic nature of the copolyesteramide mesophase was confirmed by a thread-like texture appearance observed with a polarizing optical microscope. A peak having an endothermic maximum is at the temperature of about 500° C. which was associated with isotropization followed by the thermal decomposition of the polymer.

Polyamideimide displayed a single glass transition temperature at about 280° C. Differential scanning calorimeter thermograms of copolyesteramide/polyamideimide blends from the second heating and the second cooling are disclosed in FIGS. 2 and 3, respectively. The first heating and first cooling were considered the blending at 340° C. to form the polyamideimide polymer composition and the cooling thereof. The transition temperatures of blends changed with composition. The blend having 75% copolyesteramide had similar heating and cooling curves as the copolyesteramide but had a lower mesophase transition. The cooling curves of copolyesteramide and 75% copolyesteramide displayed a considerable cooling at the N→K transition. The 50% copolyesteramide composition blend had two glass transition temperatures ($T_g$). Only one $T_g$ was observed for each of the 5% to 25% copolyesteramide blends. Although the $T_g$ of the copolyesteramide remained constant in the heating curves, it increased with the polyamideimide concentration in the cooling curves. The $T_g$ of the polyamideimide decreased with increasing copolyesteramide concentration.

The processability of polyamideimide and copolyesteramide/polyamideimide blends of 5/95 and 10/90 was evaluated on the Haake torque rheometer. The results of torque versus mixing time are shown in FIG. 4. With only 5% copolyesteramide mixed with the polyamideimide, the torque necessary to mix 60 grams of material was significantly decreased after about four minutes. The torque was reduced from about 2800 mg to 400 mg, an eighty-six percent decrease.

Figure 5:
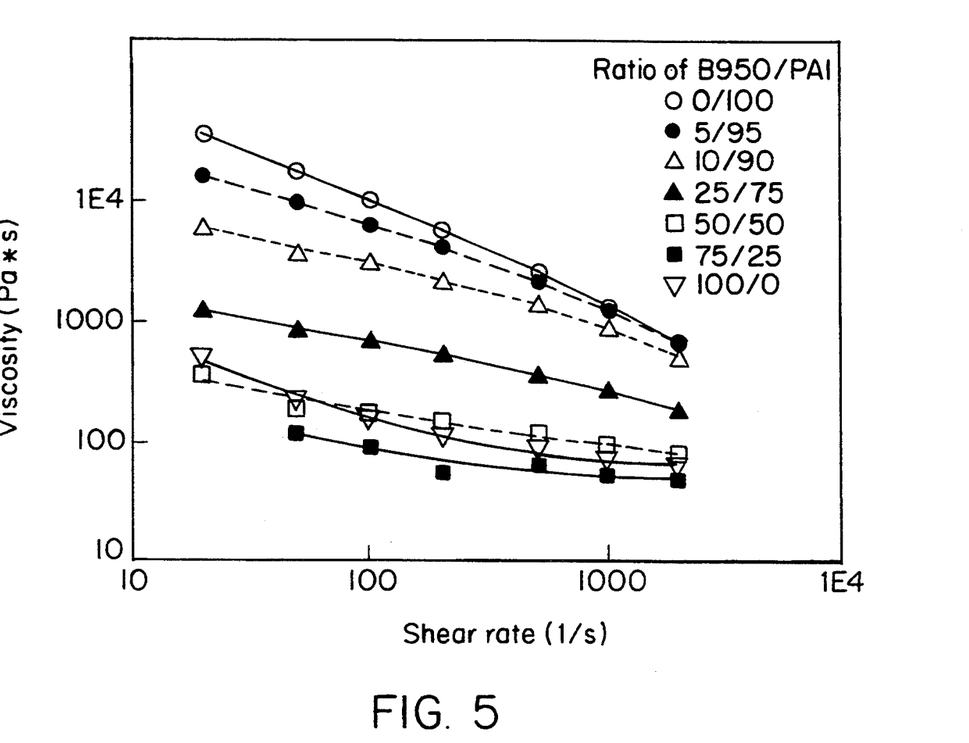
FIG. 5 is a plot of viscosity versus shear rate at the temperature of about 310° C. for blends of aromatic copolyesteramide and polyamideimide having weight ratios of 100/0, 75/25, 50/50, 25/75, 10/90, 5/95 and 0/100.

The rheological behavior of the polyamideimide, the copolyesteramide and their blends is disclosed in FIG. 5. Introducing copolyesteramide into polyamideimide significantly decreased the melt viscosity. The viscosity of a blend having 50% copolyesteramide was very close to the viscosity of polyamideimide. For a 75% copolyesteramide composition, the viscosity was lower than either component in the blend.

Figure 6:
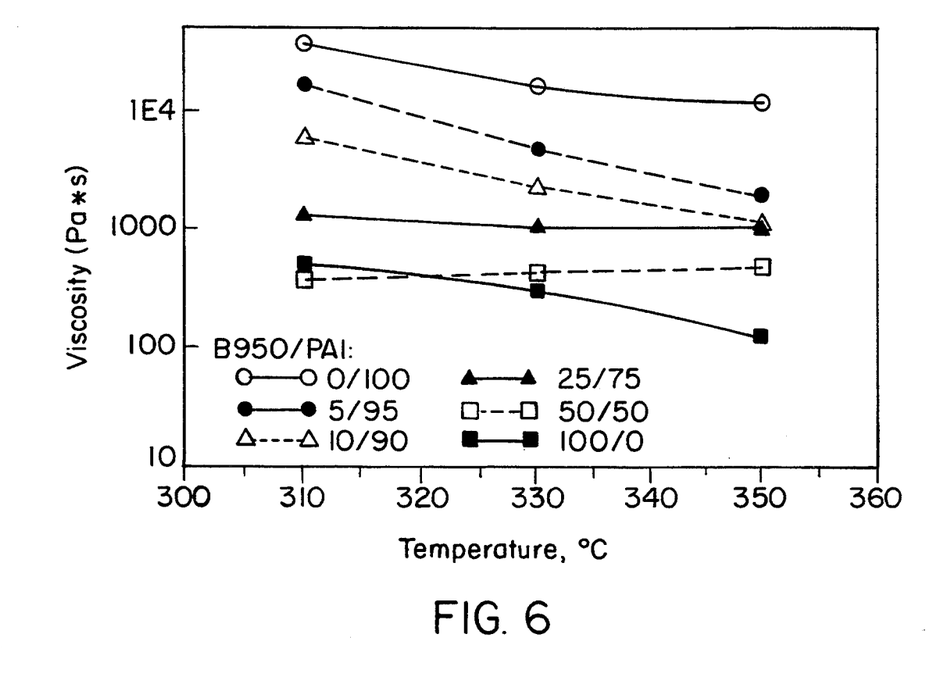
FIG. 6 is a plot of viscosity versus temperature at a shear rate of 20 sec$^{-1}$ for blends of aromatic copolyesteramide and polyamideimide having weight ratios of 100/0, 50/50, 25/75, 10/90, 5/95 and 0/100.

A plot of the viscosity versus temperature at a shear rate of 20 sec$^{-1}$ for the copolyesteramide, the polyamideimide and their blends is shown in FIG. 6. The viscosity of the copolyesteramide, the polyamideimide and the blends with 5% and 10% copolyesteramide decreased with increasing temperature, while the viscosity of 25% and 50% copolyesteramide compositions did not. By adding only about 5% copolyesteramide to the polyamideimide, the melt viscosity of the composition was lowered to about one-fifth that of the polyamideimide. The processing temperature of the composition blends is much lower than that of only polyamideimide. For copolyesteramide/polyamideimide composition blends, the transition temperatures shifted with the change in the content of the composition.

Processability of polyamideimide was significantly improved by blending a copolyesteramide with polyamideimide. The melt viscosity was significantly reduced. Adding only 5% copolyesteramide decreased the mixing torque to one thirteenth and the melt viscosity to a fifth. The viscosity of 75% copolyesteramide was lower than that of either component.

EXAMPLE 2

The procedures of Example 1 were repeated on blends of polyamideimide, Torlon ™ 4203L, and crystalline aromatic polyester, HX4000 ™. The weight ratios of Torlon ™ 4203L to HX4000 ™ compositions were 0/100, 25/75, 50/50, 75/25, 90/10, 95/5 and 100/0.

Figure 7:
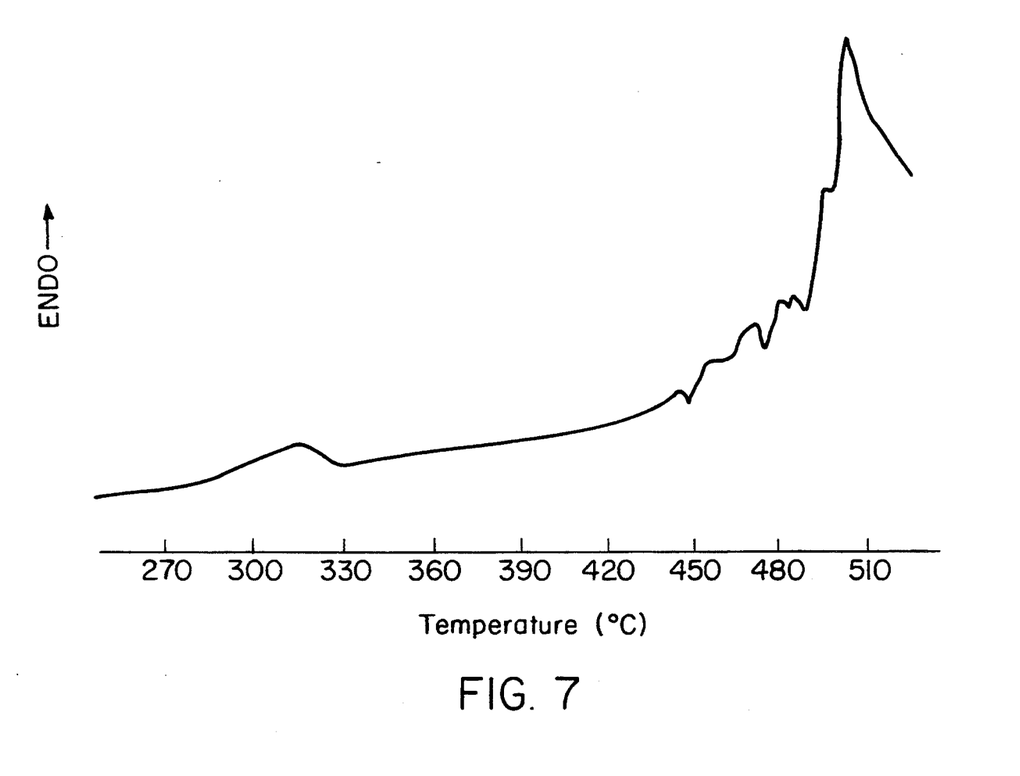
FIG. 7 is a differential scanning calorimeter thermogram for aromatic polyester (HX4000) in the temperature range of between about 270° and 510° C.

The differential scanning calorimeter thermogram of HX4000 ™ is shown in FIG. 7. The thermogram discloses a similar plot and transition temperature as did Vectra B950 in FIG. 1B.

Figure 2:
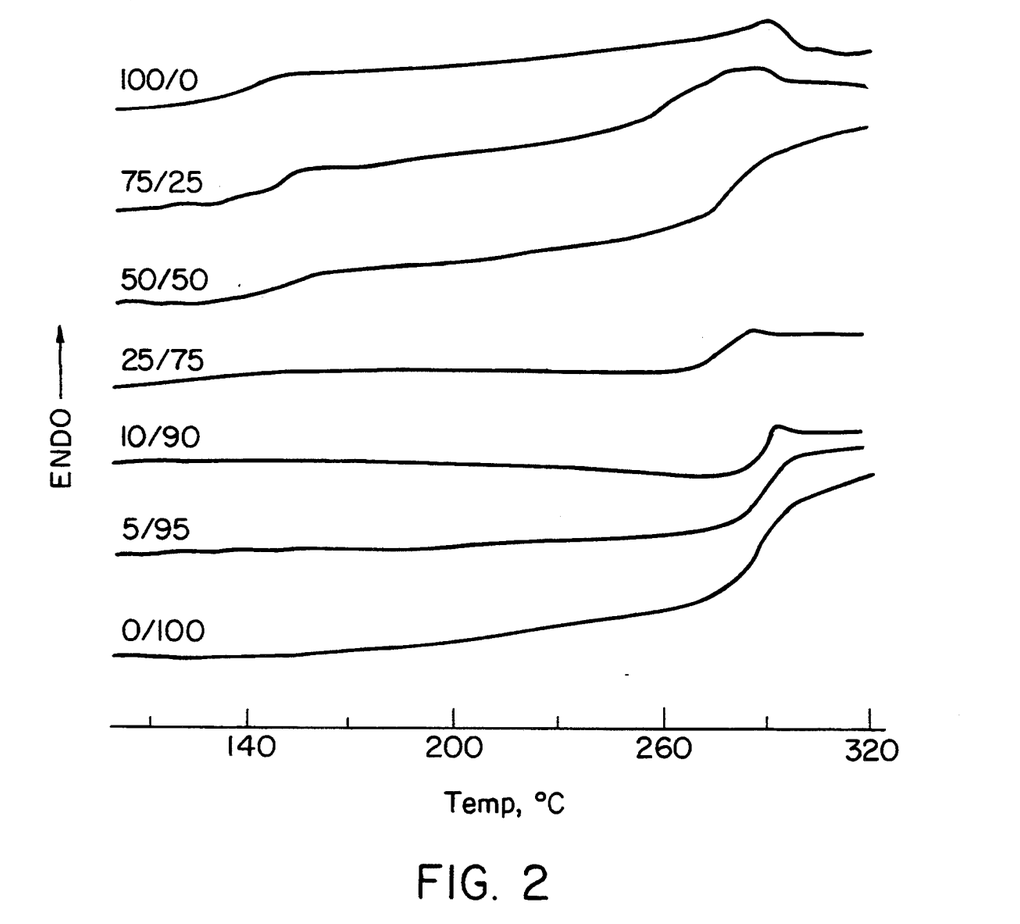
FIG. 2 is a differential scanning calorimeter thermogram from a second heating of aromatic copolyesteramide and polyamideimide blends having weight ratios of 100/0, 75/25, 50/50, 25/75, 10/90, 5/95 and 0/100 in the temperature range of between about 110° and 320° C.
Figure 3:
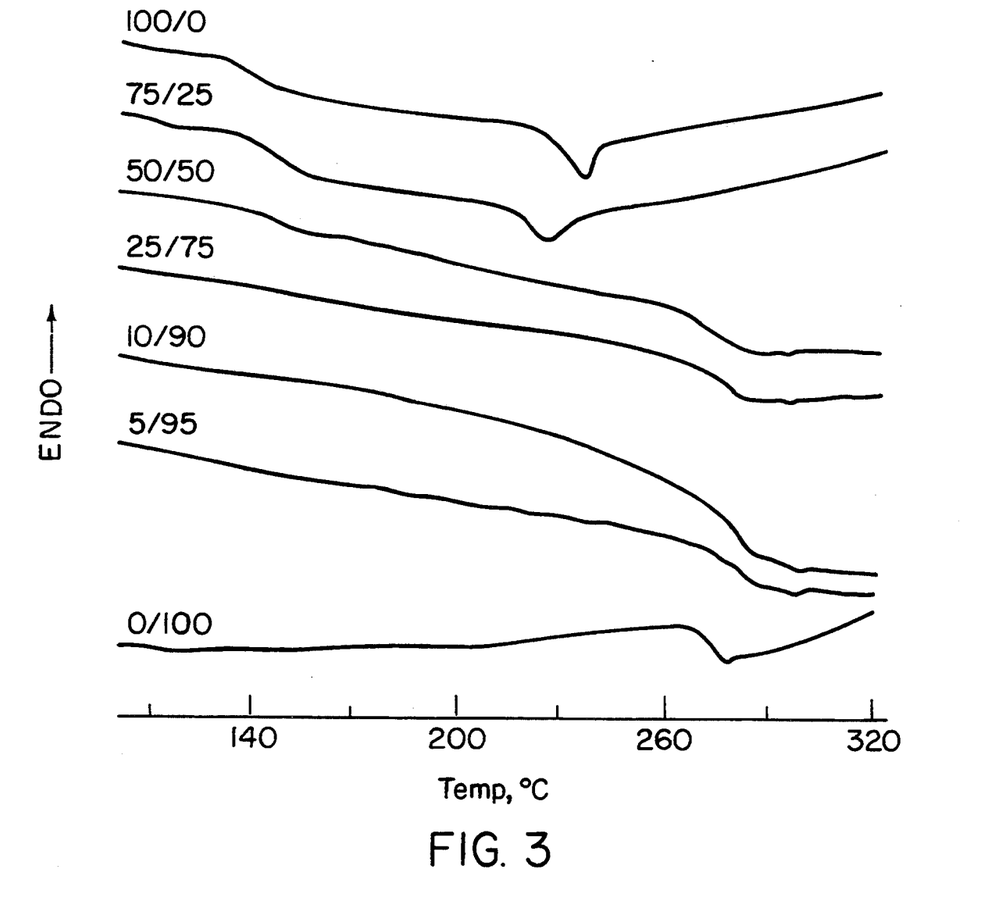
FIG. 3 is a differential scanning calorimeter thermogram from a second cooling of aromatic copolyesteramide and polyamideimide blends having weight ratios of 100/0, 75/25, 50/50, 25/75, 10/90, 5/95 and 0/100 in the temperature range of between about 110° and 320° C.
Figure 8:
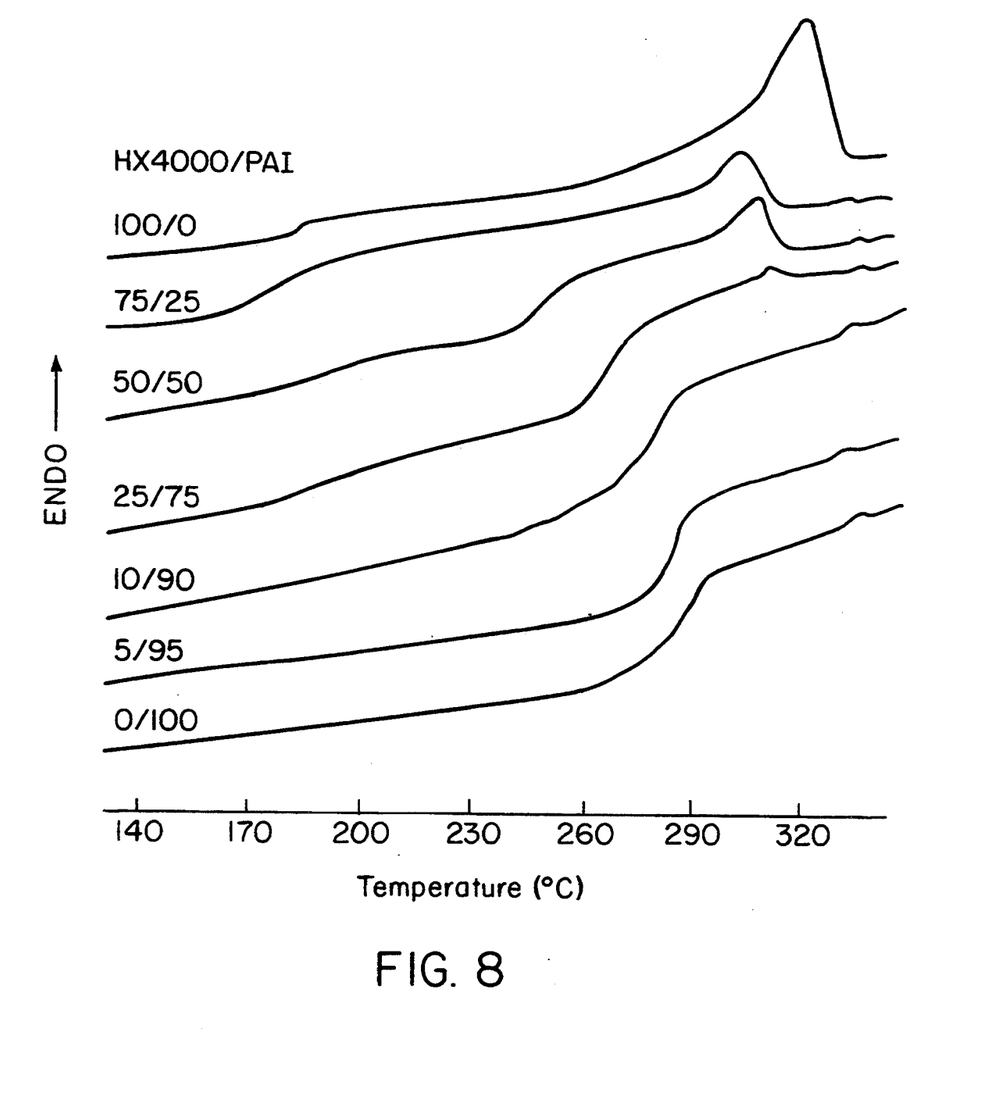
FIG. 8 is a differential scanning calorimeter thermogram from the second heating of polyamideimide and aromatic polyester blends having weight ratios of 100/0, 75/25, 50/50, 25/75, 10/90, 5/95 and 0/100 in the temperature range of between about 140 and 320° C.
Figure 9:
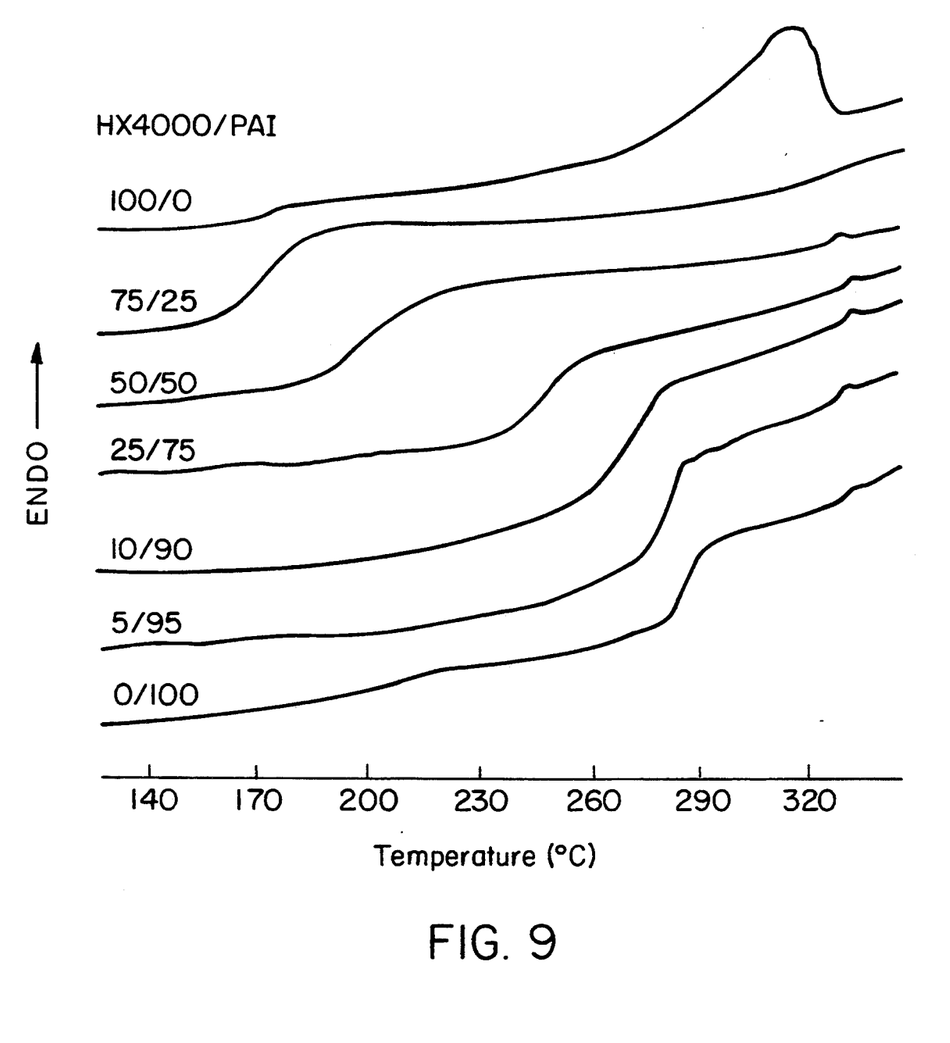
FIG. 9 is a differential scanning calorimeter thermogram for the second heating of the polyamideimide and aromatic polyester blends having weight ratios of 100/0, 75/25, 50/50, 25/75, 10/90, 5/95 and 0/100 in the temperature range of between about 140° and 320° C. after annealing for fifteen minutes at 350° C.
Figure 10:
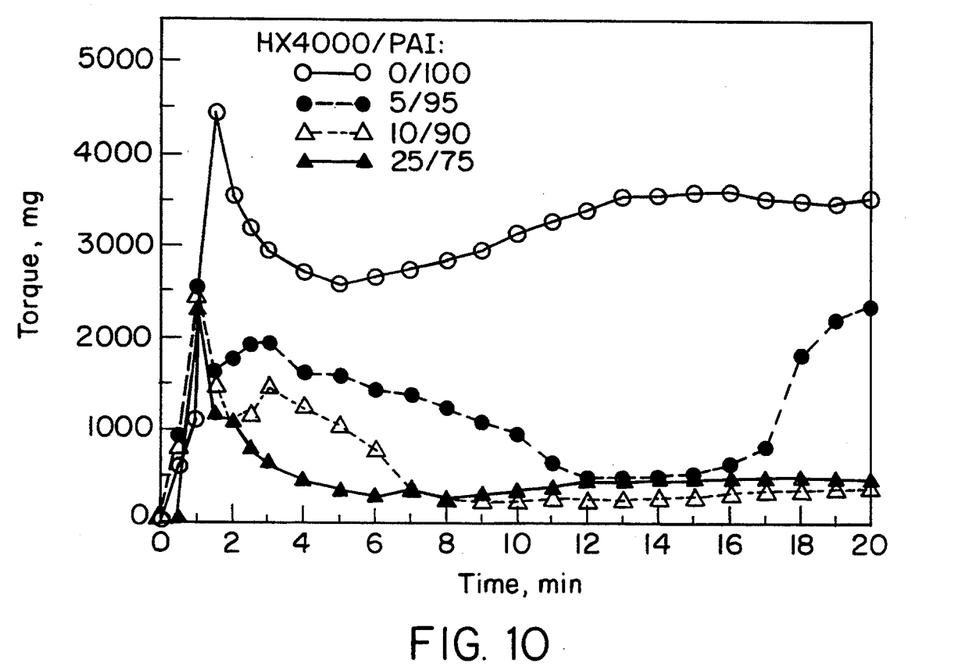
FIG. 10 is a plot of torque versus time of the aromatic polyester and polyamideimide blends having weight ratios of 0/100, 5/95, 10/90 and 25/75.

The polyamideimide/polyester blends display a single glass transition temperature at about 290° C. Differential scanning calorimeter thermograms of polyamideimide/polyester blends from the second heating and from heating at 20° C./minute after annealing fifteen minutes at 350° C. are shown in FIGS. 8 and 9, respectively. Both thermograms showed similar results as shown in FIG. 2. The processability of polyamideimide and polyamideimide/polyester blends having weight ratios of 95/5, 90/10 and 75/25 with the results of torque versus mixing time are shown in FIG. 10. With only five percent polyester added to the polyamideimide, the torque necessary to mix 60 grams of material after twelve minutes was decreased significantly. The torque was reduced from about 3400 mg for polyamideimide only to about 500 mg for a blend with 5% polyester, a decrease of about eighty-six percent. Similar decreases in torque were noted for blends containing 10% and 25% polyester. For the 5/95 blend, the torque increased after about seventeen minutes which was believed to be due to crosslinking. This phenomenon was not observed for the other blends.

Figure 11:
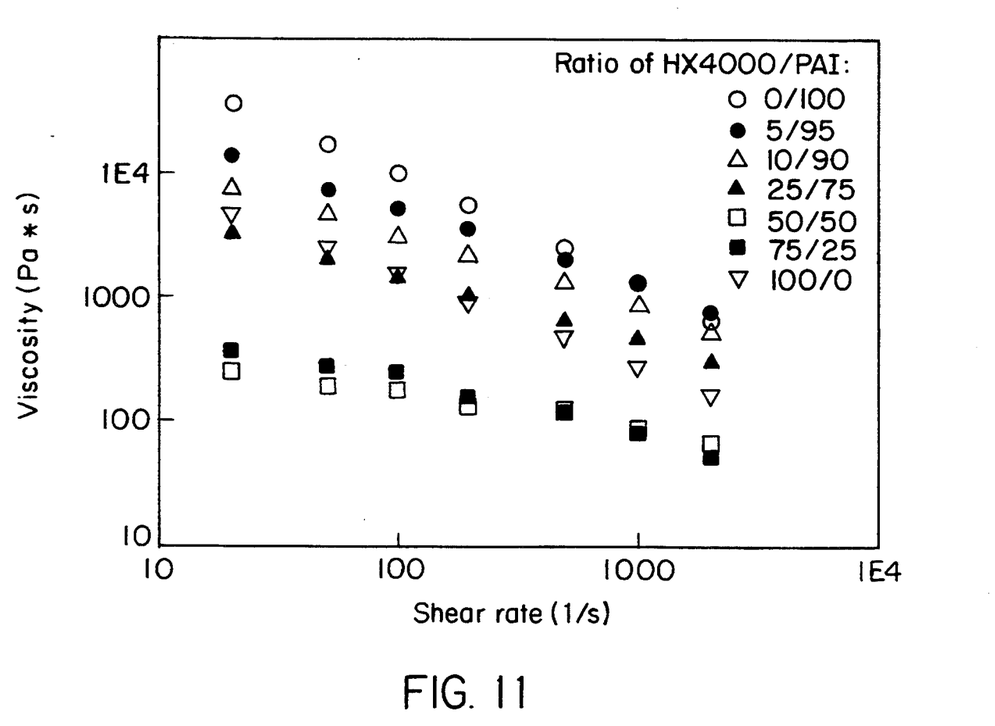
FIG. 11 is a plot of viscosity versus shear rate at the temperature of about 310° C. for blends of aromatic polyester and polyamideimide having weight ratios of 100/0, 75/25, 50/50, 25/75, 10/90, 5/95 and 0/100.
Figure 12:
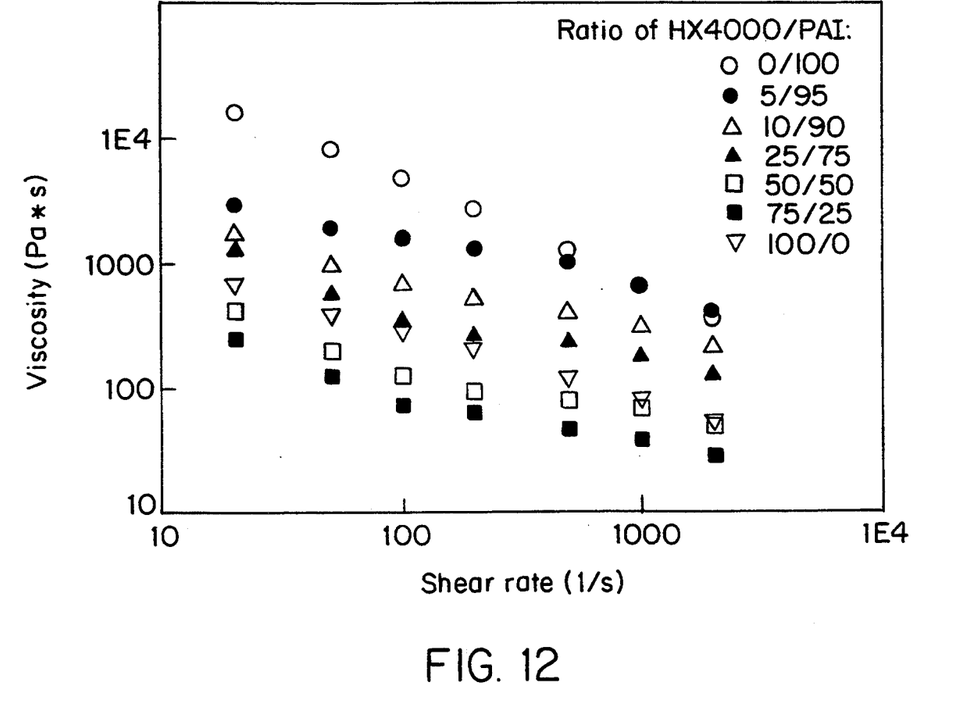
FIG. 12 is a plot of viscosity versus shear rate at the temperature of about 330° C. for blends of aromatic polyester and polyamideimide having weight ratios of 100/0, 75/25, 50/50, 25/75, 10/90, 5/95 and 0/100.
Figure 13:
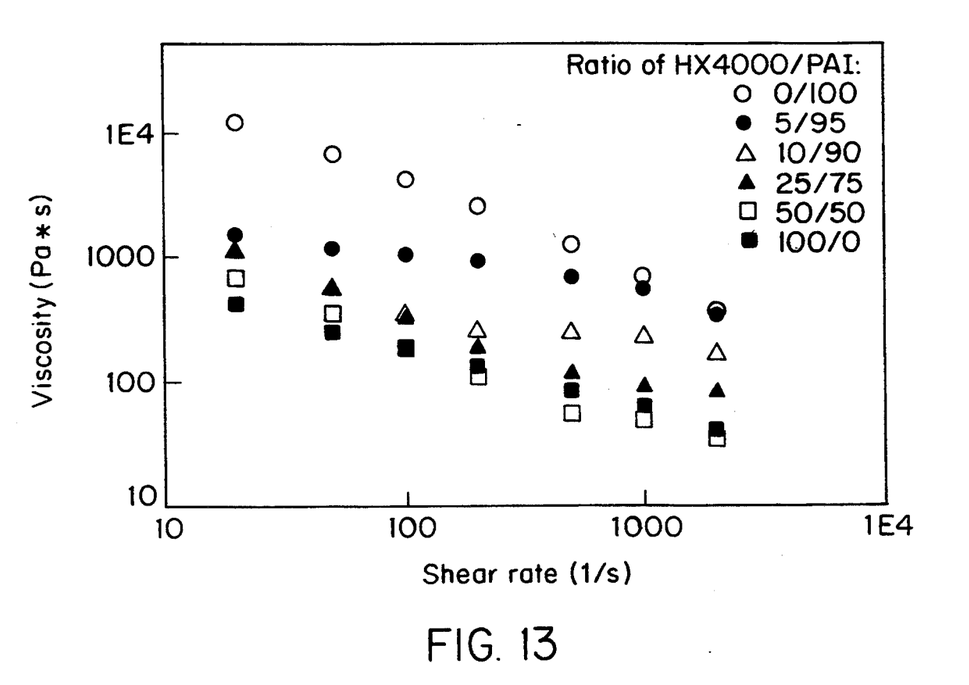
FIG. 13 is a plot of viscosity versus shear rate at the temperature of about 350° C. for blends of aromatic polyester and polyamideimide having weight ratios of 100/0, 75/25, 50/50, 25/75, 10/90, 5/95 and 0/100.

The rheological behavior of polyamideimide, polyester and their blends at the temperatures of 310°, 330° and 350° C. is disclosed in FIGS. 11, 12 and 13, respectively. The rheological properties of HX4000/polyamideimide blends were measured by a capillary rheometer, as in Example 1. The viscosity of the polyester was higher at 310° C. than at 330° C. However, the viscosity was more sensitive to shear rate at 310° than at 330° C. It is believed that the polyester was in the mesophase at 330° C. while it was not at 310° C. The viscosity of the polyester did not change very much from 330° to 350° C. The viscosity of polyamideimide decreased as the temperature was increased. However, at the temperature of 350° C., the extruded polyamideimide from the capillary rheometer has a weaker melt strength as indicated by sticking to the exit wall.

Blending polyester with polyamideimide can significantly decrease the melt viscosity, especially at the mesophase temperature range. For the polyester/polyamideimide blends of 50/50 and 75/25, the viscosities were lower than either component in the blends at the temperature of 310° and 330° C.

Equivalents

Those skilled in the art will recognize, or be able to ascertain using no more than routine experimentation, many equivalents to the specific embodiments of the invention described specifically herein. Such equivalents are intended to be encompassed in the scope of the claims.

We claim:

1. A polymer composition comprising a polyamideimide polymer and a liquid crystalline polymer, wherein the liquid crystalline polymer is in an amount which significantly decreases the melt viscosity of the polyamideimide polymer while not significantly decreasing the mechanical properties of the polyamideimide polymer.

2. The polymer composition of claim 1 wherein the polyamideimide polymer is present in the range of between about seventy and ninety-seven percent, by weight.

3. The polymer composition of claim 2 wherein the polyamideimide is Torlon 4203L TM brand polyamideimide.

4. The polymer composition of claim 1 wherein the liquid crystalline polymer is a polyester.

5. The polymer composition of claim 4 wherein the liquid crystalline polymer is an aromatic polyester.

6. The polymer composition of claim 5 wherein the aromatic polyester is HX4000 TM brand polyester.

7. A polymer composition containing a polyamideimide polymer and a liquid crystalline polyester, wherein the liquid crystalline polyester is in an amount which significantly decreases the melt viscosity of the polyamideimide polymer.

8. The polymer composition of claim 7 wherein the polyamideimide polymer is present in the range of between about seventy and ninety-seven percent, by weight.

9. A polymer composition containing a polyamideimide and a liquid crystalline aromatic polyester, wherein the liquid crystalline aromatic polyester is in an amount which decreases the melt viscosity of the polymer composition to below that of either the polyamideimide or the liquid crystalline aromatic polyester.

* * * * *